United States Patent
Bordes et al.

(10) Patent No.: US 12,184,834 B2
(45) Date of Patent: Dec. 31, 2024

(54) METHOD AND DEVICE FOR PICTURE ENCODING AND DECODING

(71) Applicant: InterDigital VC Holdings, Inc., Wilmington, DE (US)

(72) Inventors: Philippe Bordes, Laille (FR); Tangi Poirier, Thorigné-Fouillard (FR); Ya Chen, Rennes (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/290,661

(22) PCT Filed: Nov. 15, 2019

(86) PCT No.: PCT/US2019/061658
§ 371 (c)(1),
(2) Date: Apr. 30, 2021

(87) PCT Pub. No.: WO2020/106564
PCT Pub. Date: May 28, 2020

(65) Prior Publication Data
US 2022/0021869 A1    Jan. 20, 2022

(30) Foreign Application Priority Data

Nov. 21, 2018  (EP) .................................... 18306535
Dec. 20, 2018  (EP) .................................... 18306765
Feb. 14, 2019  (EP) .................................... 19305183

(51) Int. Cl.
H04N 19/105    (2014.01)
H04N 19/159    (2014.01)
(Continued)

(52) U.S. Cl.
CPC ......... *H04N 19/105* (2014.11); *H04N 19/159* (2014.11); *H04N 19/176* (2014.11); *H04N 19/577* (2014.11)

(58) Field of Classification Search
CPC ............... H04N 19/105; H04N 19/157; H04N 19/159; H04N 19/176; H04N 19/577;
(Continued)

(56) References Cited

U.S. PATENT DOCUMENTS

2011/0255600 A1    10/2011  Lin et al.
2014/0023138 A1*    1/2014  Chen .................... H04N 19/463
                                                             375/240.12
(Continued)

FOREIGN PATENT DOCUMENTS

CN    105379288 A    3/2016
CN    106797479 A    5/2017
(Continued)

OTHER PUBLICATIONS

Chiang et al, "CE10.1: Combined and Multi-Hypothesis Prediction (CE10.1.1.a, CE10.1.1.b, CE10.1.1.c, CE10.1.1. d)", MediaTek, Joint Video Experts Team (JVET) of ITU-T SG 16 WP 3 and ISO/IEC JTC 1/SC 29/WG 11, JVET-L0100-v3, 12th Meeting: Macao, China, Oct. 3, 2018, 14 pages.
(Continued)

*Primary Examiner* — Md N Haque
(74) *Attorney, Agent, or Firm* — Condo Roccia Koptiw LLP

(57) ABSTRACT

A decoding method is disclosed. It comprises: —decoding parameters for a current block; —disabling a first coding tool for said current block in the case where one or more of the following conditions is verified: a second coding tool is used for said current block and a given condition on the decoded parameters is verified; —enabling for said current
(Continued)

block said first coding tool otherwise; and —decoding said current block using said first coding tool if said first coding tool is enabled.

18 Claims, 11 Drawing Sheets

(51) Int. Cl.
*H04N 19/176* (2014.01)
*H04N 19/577* (2014.01)

(58) Field of Classification Search
CPC .. H04N 19/103; H04N 19/107; H04N 19/119; H04N 19/593
See application file for complete search history.

(56) References Cited

U.S. PATENT DOCUMENTS

| | | | |
|---|---|---|---|
| 2015/0023422 A1 | 1/2015 | Zhang et al. | |
| 2015/0030087 A1 | 1/2015 | Chen et al. | |
| 2015/0189323 A1 | 7/2015 | An et al. | |
| 2015/0271524 A1* | 9/2015 | Zhang | H04N 19/30 375/240.16 |
| 2016/0080751 A1* | 3/2016 | Xiu | H04N 19/157 375/240.02 |
| 2016/0105682 A1 | 4/2016 | Rapaka et al. | |
| 2017/0064313 A1* | 3/2017 | Wu | H04N 19/172 |
| 2017/0280162 A1 | 9/2017 | Zhao et al. | |

FOREIGN PATENT DOCUMENTS

| | | | | |
|---|---|---|---|---|
| CN | 108781289 A | | 11/2018 | |
| CN | 110574374 A | * | 12/2019 | ........... H04N 19/119 |
| RU | 2530318 C2 | | 10/2014 | |
| WO | 2004/066634 A1 | | 8/2008 | |
| WO | WO 2010017166 A2 | | 2/2010 | |
| WO | 2016/057938 A1 | | 4/2016 | |
| WO | 2018/171796 A1 | | 9/2018 | |
| WO | WO 2019238008 A1 | | 12/2019 | |
| WO | 2020/098644 A1 | | 5/2020 | |

OTHER PUBLICATIONS

Tamse et al, "CE4.7.1 and CE4.7.2—Non Temporal Illumination Compensation in JVET-K1024", Joint Video Experts Team (JVET) of ITU-T SG16 WP3 and ISO/IED JTC 1/SC 29/WG 11, Document: JVET-K0056-v1, 12th Meeting: Macao, China, Oct. 3, 2018, 4 pages.
Tamse et al, "[CE4.6.3—Inter Prediction Refinement in JVET-J0024]", Joint Video Experts Team (JVET) of ITU-T SG 16 WP 3 and ISO/IEC JTC 1/SC 29/WG 11, Document: JVET-K0118-v1, 11th Meeting: Ljubljana, Slovenia, Jul. 10, 2018, 3 pages.
Abe et al, "CE4-related: Low pipeline latency LIC", Joint Video Exploration Team (JVET) of ITU-T SG 16 WP 3 and ISO/IEC JTC 1/SC 29/WG 11, Document: JVET-L0120-v2, 12th Meeting: Macao, China, Oct. 3, 2018, 5 pages.
Xiu et al, "CE9-Related: Complexity Reduction and Bit-Width Control for Bi-Directional Optical Flow (BIO)", Joint Video Experts Team (JVET) of ITU-T SG 16 WP 3 and ISO/IEC JTC 1/SC 29/WG 11, Document: JVET-L0256, 12th Meeting, Macao, China, Oct. 3, 2018, 14 pages.
Bordes et al "CE4-related: LIC with reduced memory buffer", Joint Video Experts Team (JVET) of ITU-T SG 16 WP 3 and ISO/IED JTC 1/SC 29/WG 11, Document: JVET-L0203-v3, 12th Meeting, Macao, China, Oct. 3, 2018, 6 pages.
Anonymous, "High Efficiency Video Coding", International Telecommunication Union, ITU-T Telecommunication Standardization Sector of ITU, Series H: Audiovisual and Multimedia Systems—Infrastructure of audiovisual services—Coding of moving video, Recommendation ITU-T H.265, Apr. 2013, 321 pages.
Chen et al., "Algorithm Description of Joint Exploration Test Model 7 (JEM 7)", Joint Video Exploration Team (JVET) of ITU-T SG 16 WP3 and ISO/IEC JTC 1/SC 29/WG 11, Document: JVET-G1001-v1, 7th Meeting, Torino, Italy, Jul. 13, 2017, 50 pages.
Alexander et al, "Bi-directional Optical Flow for Future Video Codec", 2016 Data Compression Conference (DCC), SnowBird, Utah, USA, Mar. 30, 2016, 8 pages,.
Chen et al, "Algorithm description for Versatile Video Coding and Test Model 2 (VTM 2)", Joint Video Experts Team (JVET) of ITU-T SG 16 WP3 and ISO/IEC JTC 1/SC 29/WG 11, Document: JVET-K1002-v2, 11th Meeting: Ljubljana, Slovenia, Jul. 10, 2018, 21 pages.
Liao et al, "CE10 related: Combining multi-hypothesis prediction with triangular prediction unit mode", Joint Video Exploration Team (JVET) of ITU-T SG16 WP3 and ISO/IEC JTC 1/SC 29/WG 11, Document: JVET-K0148-v2, 11th Meeting: Ljubljana, Slovenia, Jul. 10, 2018, 4 pages.
Hsu et al, "Description of Core experiment 10 (CE10): Combined and multi-hypothesis prediction", Joint Video Experts Team (JVET) of ITU-T SG16 WP3 and ISO/IEC JTC 1/SC 29/WG 11, Document: JVET-J1030_r1, 10th Meeting: San Diego, CA, United States, Apr. 10, 2018, 11 pages.
Hsu et al, "Description of SDR Video coding technology proposal by Mediatek", Joint Video Experts Team (JVET) of ITU-T SG 16 WP 3 and ISO/IEC JTC 1/SC 29/WG 11, Document JVET-J0018, 10th Meeting, San Diego, California, USA, Apr. 10, 2018, 64 pages.
Strom, et al., "CE14: Reduced latency, LUT-free bilateral filter", Joint Video Experts Team (JVET) of ITU-T SG 16 WP 3 and ISO/IEC JTC 1/SC 29/WG11, JVET-L0172 V2, 12th meeting: Macao, CN, Oct. 3-12, 2018, 15 pages.
Ikonin, et al., "Non-CE: Hadamard transform domain filter", Joint Video Experts Team (JVET) of ITU-T S 16 WP3 and ISO/IEC JTC 1/SC 29/WG 11, JVET-M0468, 13th Meeting, Marrakech, MA, Jan. 9-18, 2019, 7 pages.
Rash, et al., "CE10: Uniform Directional Diffusion Filters For Video Coding", Joint Video Experts Team (JVET), of ITU-T SG16 WP3 and ISO/IEC JTC 1/SC 29/WG11, 13th Meeting, Marrakech, MA, Jan. 9-18, 2019, 7 pages.
Toma et al., "Description of SDR Video Coding Technology Proposal by Panasonic", JVET-J0020-v1, Panasonic, Joint Video Experts Team (JVET) of ITU-T SG16 WP3 and ISO/IEC JTC 1/SC 29/WG 11, 10th Meeting: San Diego, California, USA, Apr. 10-20, 2018, 6 pages.
Alshina et al., "Exploration Experiments on Coding Tools Report.", JVET-E0010, Joint Exploration Team (JVET) of ITU-T SG 16 WP 3 and ISO/IEC JTC 1/SC 29/WG 11, 5th Meeting: Geneva, CH, Jan. 12-20, 2017, 11 pages.
Chen et al., "Description of SDR, HDR and 360° video coding technology proposal by Qualcomm and Technicolor—low and high complexity versions", JVET-J0021, JVET of ITU-T SG 16 WP 3 and ISO/IEC JTC 1/SC 29/WG 11; 10th Meeting: San Diego, US; Qualcomm, Technicolor, Apr. 10-20, 2018, 43 pages.
Chen et al., "Non-CE9: Simplification of DMVR and BDOF combination", JVET-N0484-V3, Joint Video Exploration Team (JVET) of ITU-T SG 16 WP3 and ISO/IEC JTC 1/SC 29/WG 11, 14th Meeting: Geneva, CH, Mar. 19-27, 2019, 5 pages.
Hashimoto, et al., "Non-CE4: Weighted prediction with BDOF and bi-prediction with CU weights harmonization", JVET-M0067-v1, Joint Video Experts Team (JVET) of ITU-T SG 16 WP 3 and ISO/IEC JTC 1/SC 29/WG 11, 13th Meeting: Marrakech, MA, Jan. 9-18, 2019, 6 pages.
Lai, et al., "CE9-related: BIO simplification", JVET-L0099-v3, Joint Video Experts Team (JVET) of ITU-T SG 16 WP 3 and ISO/IEC JTC 1/SC 29/WG 11, 12th Meeting, Macao, China, Oct. 3-12, 2018, 6 pages.

* cited by examiner

METHOD AND DEVICE FOR PICTURE ENCODING AND DECODING

CROSS REFERENCE TO RELATED APPLICATIONS

This application is the national stage entry under 35 U.S.C. § 365 371 of International Application PCT/US2019/061658, filed Nov. 15, 2019, which was published in accordance with PCT Article 21 (2) on May 28, 2020, in English, and which claims the benefit of European Patent Application No. 18306535.8, filed Nov. 21, 2018; European Patent Application No. 18306765.1, filed Dec. 20, 2018; and European Patent Application No. 19305183.6, filed Feb. 14, 2019.

1. TECHNICAL FIELD

At least one of the present embodiments generally relates to a method and a device for picture encoding and decoding, and more particularly, to a method and a device for picture encoding and decoding using various coding tools, e.g. Motion Compensation, Local Illumination Compensation, Generalized Bi-prediction, post-reconstruction filters, etc.

2. BACKGROUND ART

To achieve high compression efficiency, image and video coding schemes usually employ prediction and transform to leverage spatial and temporal redundancy in the video content. Generally, intra or inter prediction is used to exploit the intra or inter frame correlation, then the differences between the original image block and the predicted image block, often denoted as prediction errors, prediction residuals or predictor, are transformed, quantized and entropy coded. During encoding the original image block is usually partitioned/split into sub-blocks possibly using quad-tree partitioning. To reconstruct the video, the compressed data is decoded by inverse processes corresponding to the prediction, transform, quantization and entropy coding.

3. BRIEF SUMMARY

According to a general aspect of at least one embodiment, a method for decoding video data is presented, comprising:
  decoding parameters for a current block;
  disabling a coding tool for said current block in the case where one or more of the following conditions is verified: a first coding tool is used for said current block and a given condition on decoded parameters is verified;
  enabling for said current block said coding tool otherwise; and
  decoding said current block responsive to the coding tool.

According to a general aspect of at least one embodiment, a method for encoding video data is presented, comprising:
  obtaining parameters for a current block;
  disabling a coding tool for said current block in the case where one or more of the following conditions is verified: a first coding tool is used for said current block and a given condition on the obtained parameters is verified;
  enabling for said current block said coding tool otherwise; and
  encoding said current block responsive to the coding tool.

According to a general aspect of at least one embodiment, a decoding apparatus is presented, comprising one or more processors configured to perform:
  decoding parameters for a current block;
  disabling a coding tool for said current block in the case where one or more of the following conditions is verified: a first coding tool is used for said current block and a given condition on decoded parameters is verified;
  enabling for said current block said coding tool otherwise; and
  decoding said current block responsive to the coding tool.

According to a general aspect of at least one embodiment, a method for encoding video data is presented, comprising: obtaining parameters for a current block; disabling a coding tool for said current block in the case where one or more of the following conditions is verified: a first coding tool is used for said current block and a given condition on the obtained parameters is verified; enabling for said current block said coding tool otherwise; and encoding said current block responsive to the coding tool. According to a general aspect of at least one embodiment, an encoding apparatus is presented, comprising one or more processors configured to perform:
  obtaining parameters for a current block;
  disabling a coding tool for said current block in the case where one or more of the following conditions is verified: a first coding tool is used for said current block and a given condition on the obtained parameters is verified;
  enabling for said current block said coding tool otherwise; and
  encoding said current block responsive to the coding tool.

According to another general aspect of at least one embodiment, a bitstream is formatted to include signal generated according to the encoding methods described above.

One or more of the present embodiments also provide a computer readable storage medium having stored thereon instructions for encoding or decoding video data according to at least part of any of the methods described above. One or more embodiments also provide a computer readable storage medium having stored thereon a bitstream generated according to the encoding methods described above. One or more embodiments also provide a method and apparatus for transmitting or receiving the bitstream generated according to the encoding methods described above. One or more embodiments also provide a computer program product including instructions for performing at least part of any of the methods described above.

4. BRIEF SUMMARY OF THE DRAWINGS

5. DETAILED DESCRIPTION

Figure 1A:
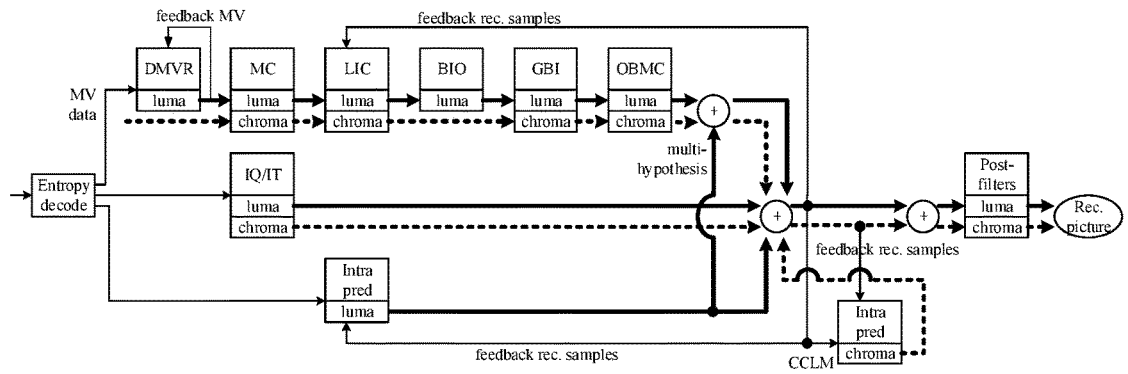
FIG. 1a depicts an overall decoding pipeline.

In HEVC coding, a picture is partitioned into CTUs of square shape with a configurable size typically 64×64. The size may be 128×128, or 256×256 in other video coding standards. A CTU is the root of a quad-tree partitioning into 4 square Coding Units (CU) of equal size, i.e. half of the parent block size in width and in height. A quad-tree is a tree in which a parent node can be split into four child nodes, each of which may become parent node for another split into four child nodes. In HEVC, a coding Block (CB) contains the samples of one color component corresponding to one CU. It is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU.

In more recent encoding systems, a CTU is the root of a coding tree partitioning into Coding Units (CU). A coding tree is a tree in which a parent node (usually corresponding to a block) can be split into child nodes (e.g. into 2, 3 or 4 child nodes), each of which may become parent node for another split into child nodes. In addition to the quad-tree split mode, new split modes (binary tree symmetric split modes, binary tree asymmetric split modes and triple tree split modes) are also defined that increase the total number of possible split modes. The coding tree has a unique root node, e.g. a CTU. A leaf of the coding tree is a terminating node of the tree. Each node of the coding tree represents a block that may be further split into smaller blocks also named sub-blocks. Once the partitioning of a CTU into CUs is determined, CUs corresponding to the leaves of the coding tree are encoded. The partitioning of a CTU into CUs and the coding parameters used for encoding each CU (corresponding to a leaf of the coding tree) may be determined on the encoder side through a rate distortion optimization procedure.

In the present application, the term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of numerous sizes.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

In the present application, the terms "enabled" and "used" may be used interchangeably in the case where they apply to a coding tool at a block level. In the same manner, "disabled" and "not used" may be used interchangeably in the case where they apply to a coding tool at a block level.

In the present application, the terms "coding tool" and "coding process" may be used interchangeably.

In recent encoding systems, e.g. in the reference software (known as VTM) of the Versatile Video Coding (VVC), the decoding pipeline includes several cascaded tools. The decoding pipeline for VVC is depicted in FIG. 1a. The decoding process is done at the Coding Unit (CU) level. A CU comprises C square or rectangular blocks (e.g. C=3 for YUV or RGB chroma format). In 4:2:0 format, the two chroma blocks are downscaled with respect to the luma block by a ratio of two both in horizontal and vertical directions.

The "entropy decode" process parses the bitstream and decodes the syntax elements such as coding modes (e.g. inter/intra coding mode) and associated parameters (e.g. intra direction, inter motion vectors MV and reference indexes).

The motion compensation (MC) interpolates samples of one or two (in case of bi-prediction) rectangular block(s) (same size as current CU) in a reference picture using MC filters, with a displacement equal to MV (mvX, mvY) in reference picture relative to current block's position.

Local Illumination Compensation (LIC) aims at compensating illumination change which may occur between a predicted block and its reference block used in motion compensated (MC) temporal prediction. This is done typically using a linear IC model (a,b):

$$S_{IC}=a*S_{ref}+b \qquad (eq.1)$$

where: $S_{ref}$ is the motion compensated reference sample value and $S_{IC}$ is the predicted sample value. The LIC parameters (a,b) are computed for each block where LIC is enabled.

Figure 2:
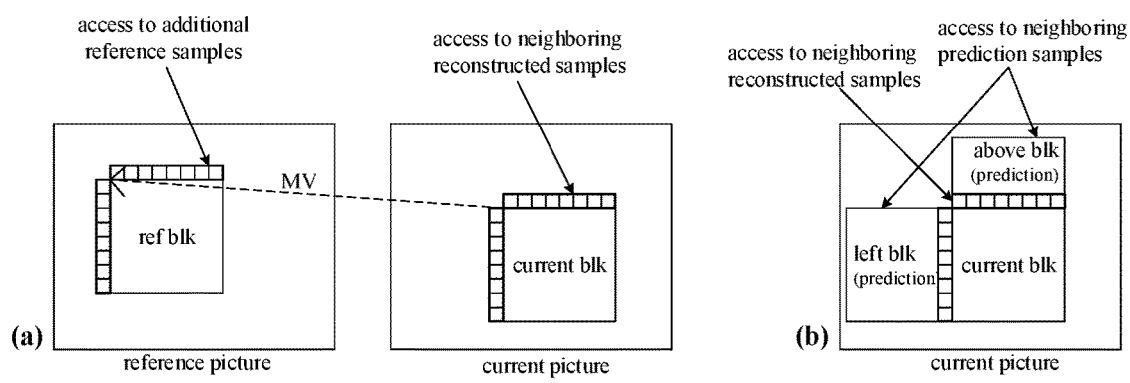
FIG. 2 illustrates the principles of Local Illumination Compensation parameters derivation.

There are several methods to compute the LIC parameters (a,b). In one method, the decoder computes the LIC parameters based on some reconstructed picture samples, e.g. based on reconstructed samples "y" localized on the left and/or on the top of the current block and reference picture samples "x" localized on the left and/or on the top of the motion compensated block (FIG. 2a). In another method, the LIC parameters are computed based on reconstructed samples "y" localized on the left and/or on the top of the current block and the corresponding prediction samples "x" used to reconstruct "y" (FIG. 2b). For these two methods, the LIC parameters can be computed and stored after each block reconstruction. The IC parameters (a,b) minimize the difference (e.g. least squares method) between the samples "y" and "a·x+b":

$$(a, b) = \underset{a,(b)}{\operatorname{argmin}} \left( \sum_{\substack{y \in L\text{-}shape\text{-}cur \\ x \in L\text{-}shape\text{-}ref}} , (y - a \cdot x - b)^2 \right) \quad \text{(eq. 2)}$$

These two methods are named "traditional LIC" hereafter. LIC introduces dependency with neighboring CUs since it uses the reconstructed samples of neighboring CUs. Consequently, the current CU has to wait for the neighboring blocks to be fully reconstructed (see "feedback rec. sample" in FIG. 1a) before the LIC parameters for the current block can be computed and thus the current block can be reconstructed.

In case of bi-prediction, a variant of LIC (called "bi-dir-IC") derives the IC parameters $(a_0,b_0)$ and $(a_1,b_1)$ directly from the two motion compensated blocks (block-0 and block-1) used in bi-prediction. It comprises estimating illumination change in-between the two reference pictures to derive the IC parameters $(a_0,b_0)$ and $(a_1,b_1)$ for the current block. For example, one computes IC parameters (a,b) for LIC between motion compensated block-1 and motion compensated block-0. Next one derives $(a_0,b_0)$ and $(a_1,b_1)$ from the values (a,b) and the picture order counts (POC) of the current picture, of reference picture 0 and and of reference picture 1. It is assumed that the values a0,a1,b0,b1 are linear functions of the temporal distance between the current frame and the reference pictures. The advantage of this variant is that it does not introduce any dependency with neighboring CUs.

In case of bi-prediction, Bi-directional Optical flow (BIO) aims at refining motion for each sample assuming linear displacement in-between the two reference pictures using Hermite's interpolation of the optical flow. A new term is thus added to the traditional bi-prediction $$\frac{I^0 + I^1}{2}:$$

$$pred = \frac{I^0 + I^1}{2} + \frac{\sigma/2(v_x(I_x^0 - I_x^1) + v_y(I_y^0 - I_y^1))}{2} \quad \text{(eq. 3)}$$

where:
$I^0$, $I^1$ are the motion compensated predictions (block-0 and block-1),
$I_x^k$ and $I_y^k$ are the horizontal and vertical gradients for the $i^{th}$ reference (k={0,1}),
$(v_x,v_y)$ is the motion vector between block-1 and block-0,
$\sigma$ is the temporal difference ($POC_1-POC_0$).

In case of bi-prediction, Decoder Side Motion Vector Refinement (DMVR) aims at refining motion by testing some displacements around the decoded MV values (MVinitial). A set of several MV pairs of candidates (MVtested(L0), MVtested(L1)) are tested. As in BIO, the tested MV values are symmetrical around the initial MV values, i.e. (MVtested(L0)−MVinitial(L0)=MVinitial(L1)−MVtested(L1)), where MVtested(L0) is the motion vector tested for list L0 and MVtested(L1) is the motion vector tested for list L1. The selected MV pair is the one which minimizes the difference MC(ref0,MVtested(L0))−MC(ref1,MVtested(L1)) using Mean-Removed Sum of Absolute Differences (MRSAD) for example.

In case of bi-prediction, two predictions blocks are computed and averaged together (a.k.a. bi-prediction averaging). In case of Generalized Bi-prediction (GBI) they are combined with a weighted sum as follows:

$$P_{GBI}=((1<<gs)-gw_1)\cdot P_0+gw_1\cdot P_1)>>gs \quad \text{(eq.4)}$$

where P0, P1 are the motion compensated predictions (block-0 and block-1). In VTM, the weights to use are coded per CU with a "gbi-index" which can take the values mentioned in Table 1.

TABLE 1

Binarization of GBi index and associated weights.

| GBi Index | Weight value of $w_1$ | $gw_1$ | gs (shift) | Binarization of GBi Index |
|---|---|---|---|---|
| 0 | −¼ | −1 | 2 | 0000 |
| 1 | ⅜ | 3 | 3 | 001 |
| 2 | ½ | 1 | 1 | 1 |
| 3 | ⅝ | 5 | 3 | 01 |
| 4 | ¾ | 5 | 2 | 0001 |

Figure 1B:
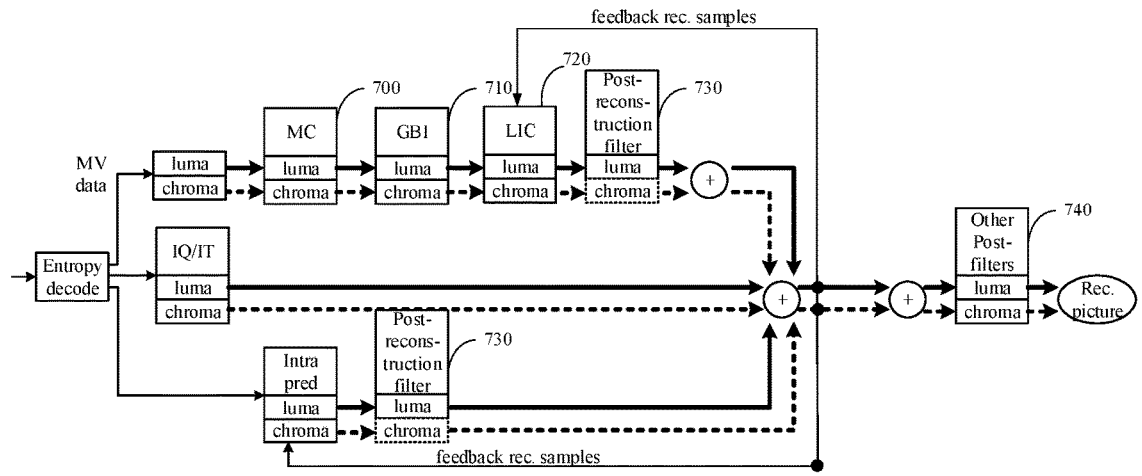
FIG. 1b and FIG. 1c depict other overall decoding pipelines.

Hereafter, the weight pair {½; ½} will be called the default weights. In FIG. 1a, the LIC process is applied before the bi-prediction averaging on each uni-directional motion compensated predictions. In a variant, the LIC process (720) is applied after the bi-prediction averaging (710) as depicted in FIG. 1b.

Figure 3:
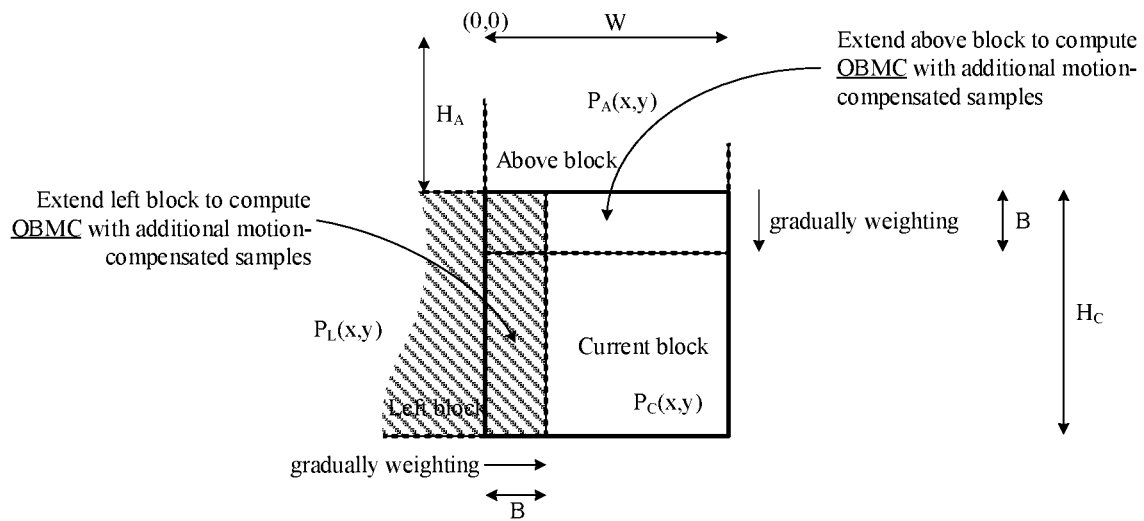
FIG. 3 illustrates the principles of Overlapped Block Motion Compensation.

According to Overlapped Block Motion Compensation (OBMC) tool (here after called "OBMC process"), the motion of the neighboring blocks is used to extend the prediction of the neighboring blocks $P_N$ (N=A or L) and to perform gradually weighting with the current block prediction $P_C$ (FIG. 3). For example, let's denote $P_A(x,y)$ the above prediction samples (x={0, . . . W−1}, y={0, . . . , $H_A$−1}) of the above block. These samples are extended with additional B rows at the bottom: $P_A(x,y)$ (x={0, . . . W−1}, y={$H_A$, . . . $H_A$+B−1} computed with same process (MC) and same motion information as the other prediction samples of $P_A$. Let's denote $P_C(x,y)$ the current prediction $P_{OBMC}$ samples (x={0, . . . W−1}, y={0, . . . $H_C$−1}), then the prediction for the top B rows of samples of the current block are finally computed as:

$$P_{OBMC}(x,y)=w_N(y)\cdot P_A(x,y+B)+wc(y)\cdot P_A(x,y) \quad \text{(eq.5)}$$

The same process is applied for the prediction samples of the left B columns based on $P_L(x,y)$ samples built from the left block data.

In the case where the neighboring block N uses LIC and/or BIO for its prediction, the additional $P_N$ samples (hereafter called "OBMC process") may also be obtained by applying LIC and BIO.

For example, typical gradually weights from border towards current block center are $w_C(y)$={¼, ⅛, 1/16, 1/32} and $w_N(y)$={¾, ⅞, 15/16, 31/32} for $P_N$ and $P_C$ respectively.

Figure 4:
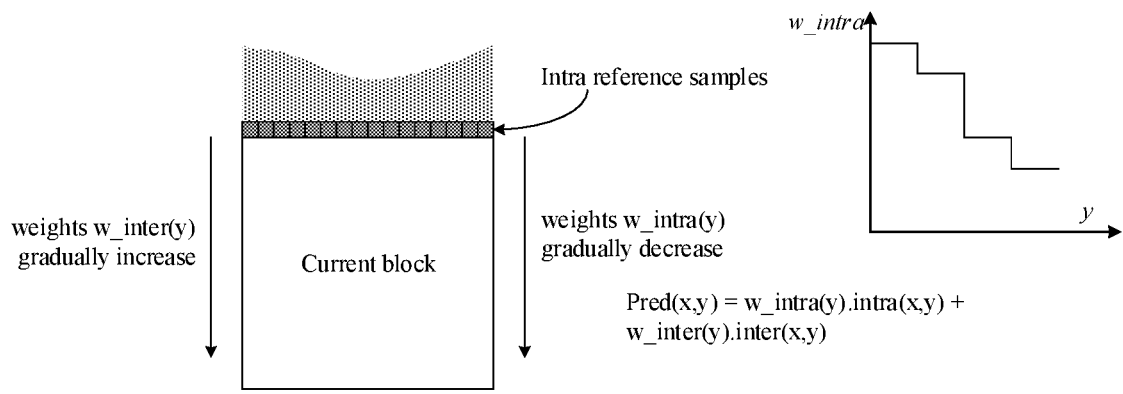
FIG. 4 illustrates the principles of multi-hypothesis prediction in case of inter and intra mode combination.
Figure 14:
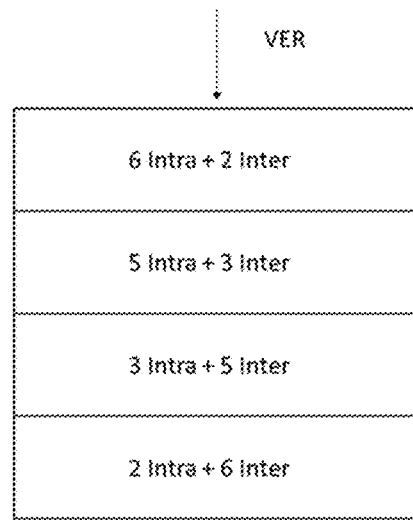
FIG. 14 illustrates the principle of multi-hypothesis.

The general Multi-Hypothesis concept includes the combination of an inter prediction performed in merge mode with an intra prediction mode or with another inter mode (e.g. uni-prediction AMVP, skip and merge) as depicted on FIG. 4. In merge mode, a list of merge candidates (reference index, motion values) is built and a merge index identifying one candidate is signaled. Motion information of a block in merge mode is then derived from the candidate identified by the merge index and used for the motion compensated prediction. The final prediction is the weighted average of the merge indexed prediction and the prediction generated by the intra prediction mode, where different weights are applied depending on the combinations. The intra prediction mode is signaled in the bitstream. In a specific embodiment, the intra prediction mode is selected in a subset of all classical prediction modes (e.g. subset size equal to 4). The current block is split into 4 equal-area regions. The weights gradually decrease as the region is far from the intra reference samples. Each weight set, denoted as (w_intrai, w_interi), where i is from 1 to 4 and (w_intra1, w_inter1)=(6, 2), (w_intra2, w_inter2)=(5, 3), (w_intra3, w_inter3)=(3, 5), and (w_intra4, w_inter4)=(2, 6), will be applied to a corresponding region, as depicted in example of FIGS. 4 and 14 for intra vertical direction prediction. When DC or planar mode is selected or the CU width or height is smaller than 4, identical weights are applied on the whole CU.

Figure 5:
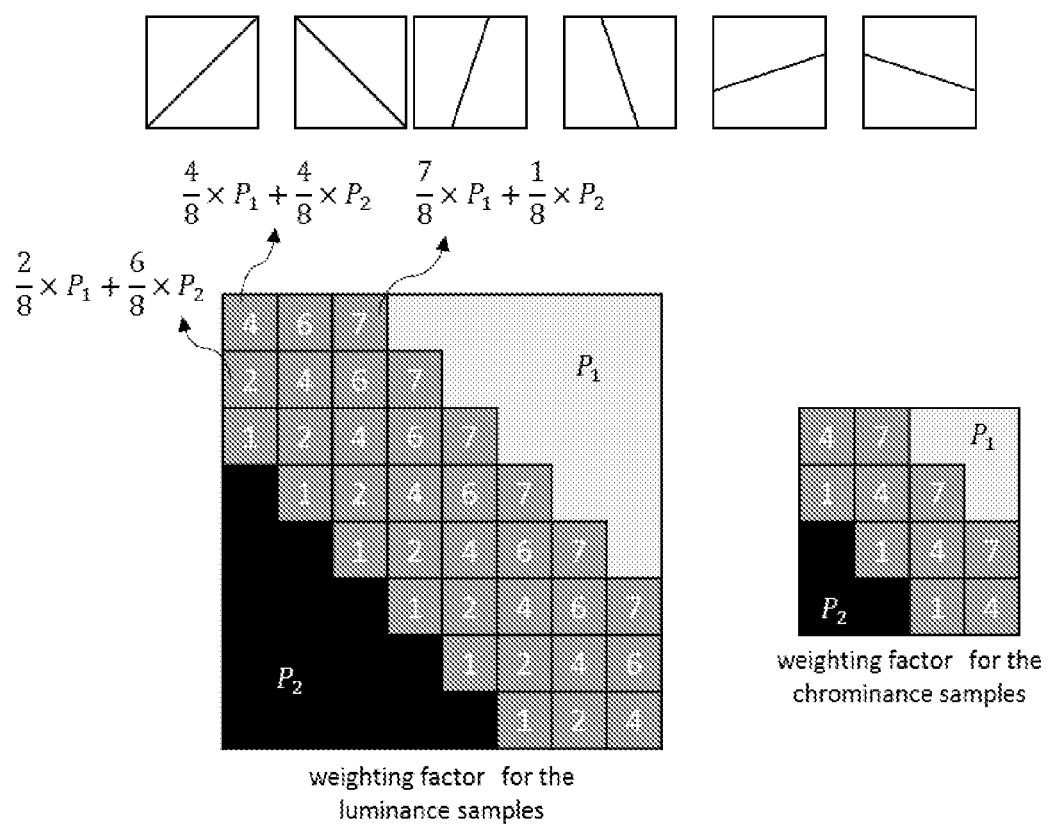
FIG. 5 illustrates the non-rectangular partitioning of a block and the associated OBMC diagonal weighting.

The geometric (e.g. triangular) modes allows more flexibility for partitioning the picture into blocks before coding. Examples of such partitioning are depicted on top of FIG. 5. Additional coding performance can be obtained by performing weighting of the two predictors on the frontiers (grey area on FIG. 5) as illustrated on bottom of FIG. 5. This weighting process may cascade with other weightings such as GBI or LIC and increase the implementation complexity.

The "post-reconstruction" filters (730) allows to filter the reconstructed samples of the current CU in the CU loop reconstruction, so that the filtered samples may be used for intra prediction or for LIC parameters derivation for the subsequent CUs in the same picture (or same slice or same tile). Whereas the "other post-filters" (740) (e.g. deblocking filter, SAO filter or ALF filter) filter the reconstructed samples after the whole picture (or slice or tile) has been reconstructed. Examples of "post-reconstruction" filters are bilateral filters (J. Strom et al., "CE14: Reduced latency, LUT-free bilateral filter," document JVET-L0172, 12th Meeting: Macao, CN, 3-12 Oct. 2018), Hadamard filters (S. Ikonen et al., "Non-CE: Hadamard transform domain filter," document JVET-M0468, 13th Meeting: Marrakech, MA, 9-18 Jan. 2019) or Diffusion filters (J. Rash et al. "CE10: Uniform Directional Diffusion Filters For Video Coding," document JVET-M0042, 13th Meeting: Marrakech, MA, 9-18 Jan. 2019).

Figure 1C:
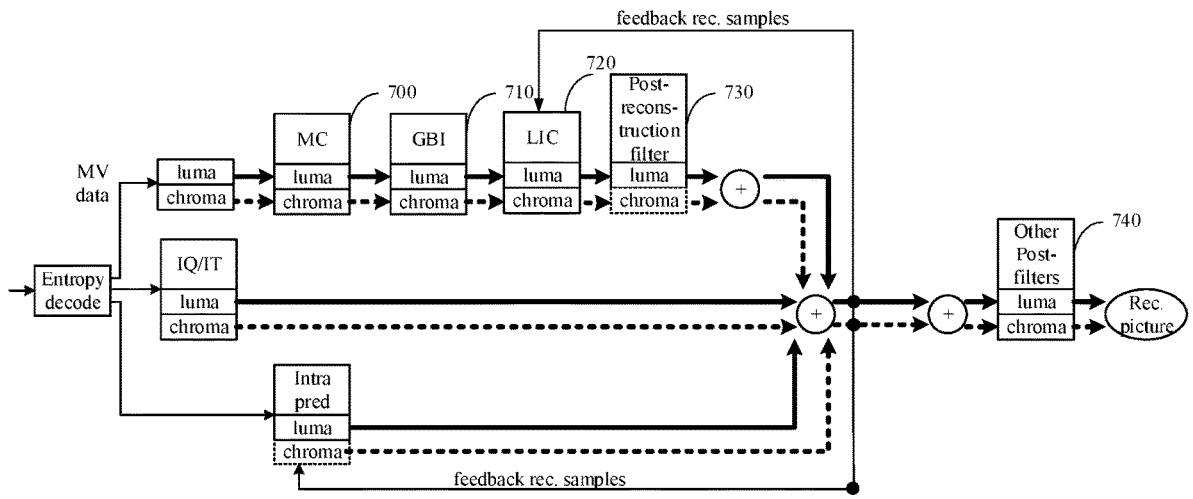

In a variant, the "post-reconstruction" filters are applied to the CU coded in inter mode only, and not for CU coded in intra or combined intra and inter predictions as depicted in FIG. 1c. In another variant the "post-reconstruction" filters are applied to the CU coded in intra only, but not in inter mode. The application of the "post-reconstruction" filters may be conditioned on other parameters such as the current CU size, the QP value or the component type (e.g. "post-reconstruction" filters not applied to the chroma component as depicted with dashed chroma box in 730).

The new video codecs implement an increased number of coding tools which may be cascaded to improve the coding efficiency. In some cases, cascading tools of same nature may be counterproductive, i.e. decrease coding efficiency, and this may also burden the pipeline of the decoding process.

At least one embodiment proposes to harmonize the interactions between different coding tools and help the implementation of video codecs on various platforms by assuring reasonable pipeline complexity. At least one embodiment proposes to apply some rules and limitations without degrading the overall codec performance.

At least one embodiment proposes to reduce both the pipeline size (number of processing stage) and the pipeline dependency introduced by some tools in "inter" coding, e.g. by adding restrictions in their mutual co-activation.

To reduce pipeline dependency, the "inter" decoding pipeline is modified.

Figure 6:
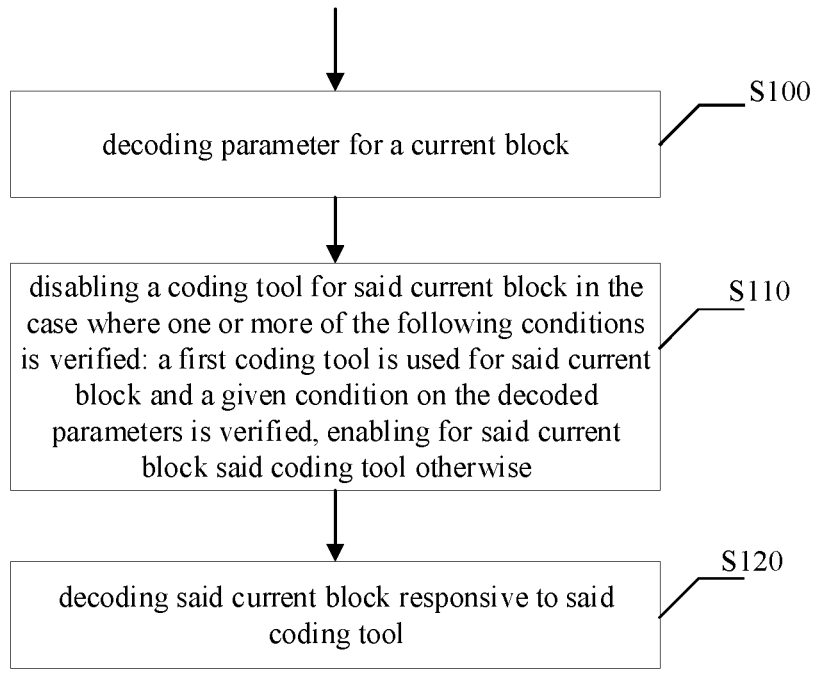
FIG. 6 depicts a flowchart of a decoding method according to one embodiment.

FIG. 6 depicts a flowchart of a decoding method according to one embodiment.

Parameters are decoded for a current block (S100). A coding tool (e.g. LIC) for the current block is disabled (S110) in the case where one or more of the following conditions is verified: a first coding tool is used (e.g. GBI is used with weights that are not default weights) for said current block and a given condition on the decoded parameters (the block size is below a value) is verified. The coding tool is enabled for said current block otherwise. The current block is decoded (S120) taking into account whether the coding tool is enabled or not. If the coding tool is enabled, the current block is decoded using the coding tool. Otherwise, the current block is decoded without using the coding tool.

Figure 7:
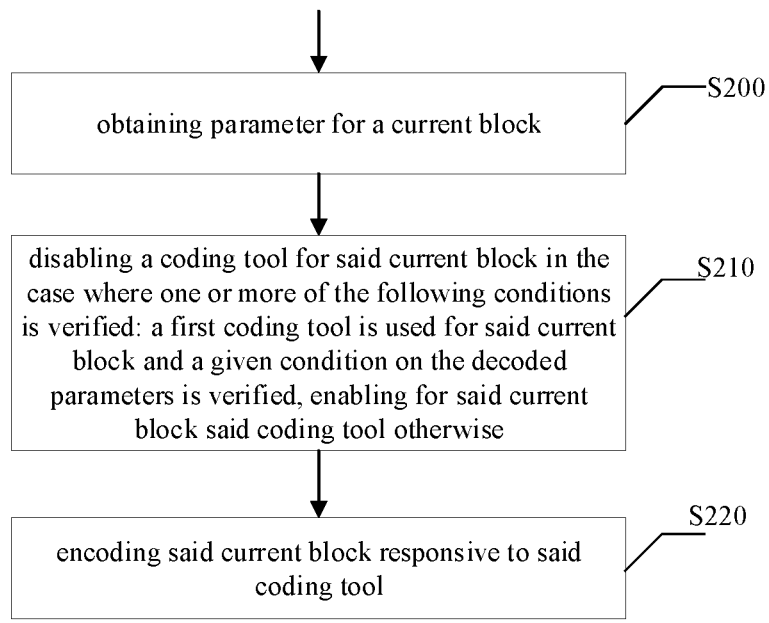
FIG. 7 depicts a flowchart of an encoding method according to one embodiment.

FIG. 7 depicts a flowchart of an encoding method according to one embodiment. Parameters are obtained for a current block (S200). A coding tool (e.g. LIC) for the current block is disabled (S110) in the case where one or more of the following conditions is verified: a first coding tool is used (e.g. GBI is used with weights that are not default weights) for said current block and a given condition on the decoded parameters (the block size is below a value) is verified. The coding tool is enabled for said current block otherwise. The current block is encoded (S220) taking into account whether the coding tool is enabled or not. If the coding tool is enabled, the current block is encoded using the coding tool. Otherwise, the current block is encoded without using the coding tool.

Disablement of a coding tool may be conditioned to some properties of the current Coding Unit (CU) and/or whether another coding tool "X" is used or not (406, 408) as illustrated by FIG. 8A to 8C.

In FIG. 8A, CU parameters are decoded (400). In the case where a condition on CU parameters is verified (410), e.g. in the case where the CU size is below a value, the coding tool/process "Y" (420) is disabled.

In FIG. 8B, CU parameters are decoded (400). In the case where a first coding tool "X" is used for the current CU (406), then the first coding tool is applied (408). In the case where a condition on CU parameters is further verified (410), e.g. in the case where the CU size is below a value, a second coding tool/process is disabled. Otherwise the second coding tool is used (420).

In a variant, in the case where the first coding tool "X" is used for the current CU (406), then the first coding tool is applied (408) and the second coding tool "Y" is disabled. In this variant, condition on CU is not checked.

In FIG. 8C, CU parameters are decoded (400). In the case where both a first coding tool "X" is used for the current CU (406) and a condition on CU parameters is verified (410), then the second coding tool "Y" is disabled. Otherwise the second coding tool is used (420). The dotted line means that application of coding tool "X" is conditioned by 406.

Figure 8:
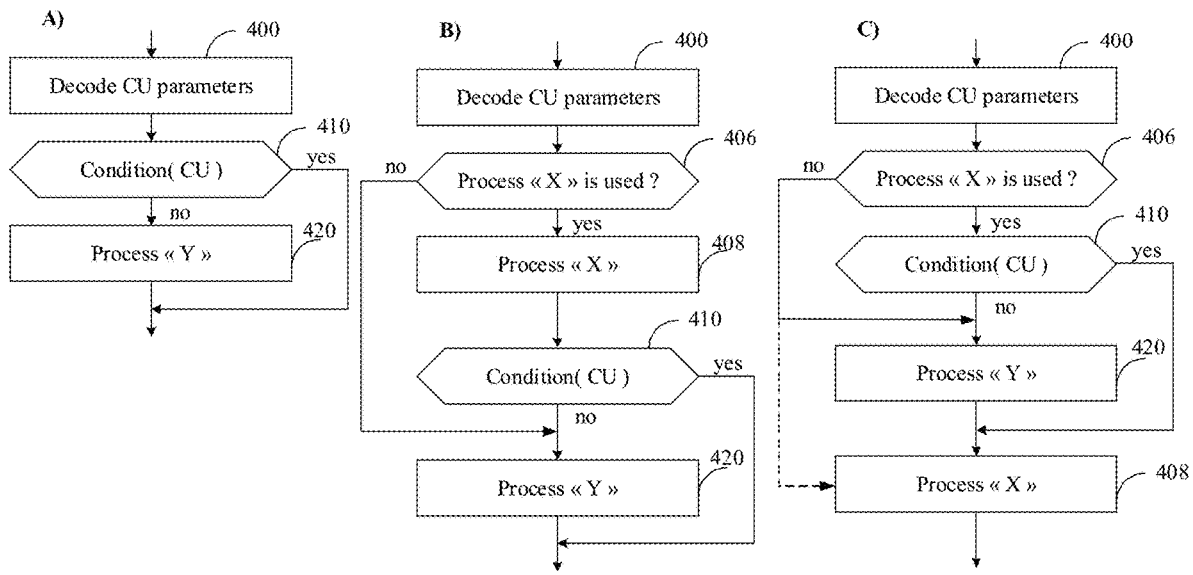
FIG. 8 depicts flowcharts of decoding processes according to various embodiments.

The variants are built from the expression of "condition (CU)" and the process order of the tools "X" and "Y" (FIG. 8—B or C). The "condition(CU)" is derived from previously decoded data (400) and can be a combination of the following rules:

Disable tool "X" for small blocks (CU size is below a value),

Disable tool "X" for chroma (CU component is chroma),

Disable tool "X" if current slice has Temporal Identifier (TiD) which is superior to a value, Disable tool "X" if it requires information (e.g. reconstructed samples) from another reconstructed block located in another CTU or outside the current VPDU (Virtual Pipeline Data Unit).

Reducing Pipeline Dependency for Multi-Hypothesis Mode

Figure 9:
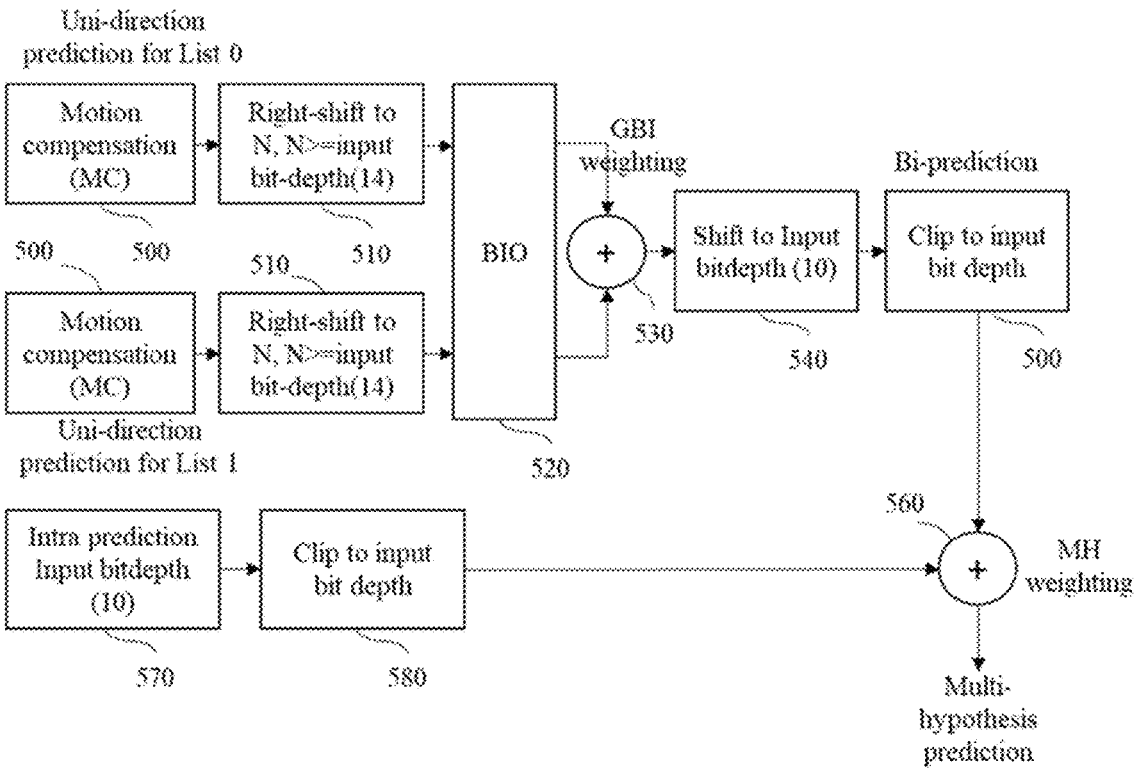
FIG. 9 depicts a flowchart of the multi-hypothesis prediction process.

FIG. 9 depicts VVC software inter-prediction pipeline process for MH in the case where the input bit-depth or internal bit-depth is equal to 10-bits and in the case where bi-prediction, BIO and GBI are also used. First, motion compensation is applied to build two references block predictions (500). The result is stored in N-bits with N>10 (510) to keep more precision in the further processes (e.g. N=14-bits), namely BIO (520) and GBI weighting (530). Next, the sample values are stored (e.g. right shift) (540) and clipped (550) in internal bit-depth (e.g. 10-bits) so that the subsequent MH process (560) is performed with internal bit-depth (e.g. 10-bits).

Since the "multi-hypothesis" (MH) uses an additional "intra" or "inter" prediction calculation and combine it with another prediction, as shown in FIG. 9, it increases the number of processing steps in the inter pipeline. One may alleviate the pipeline by one or more of the following limitations.

In one embodiment, LIC is disabled for one or all inter modes in the case where MH is used. This means if current inter mode is "merge" and LIC is disabled because MH is used, then the IC-flag is not merged but inferred to be zero. IC-flag is a parameter indicating for a block whether it uses LIC or not.

Figure 10:
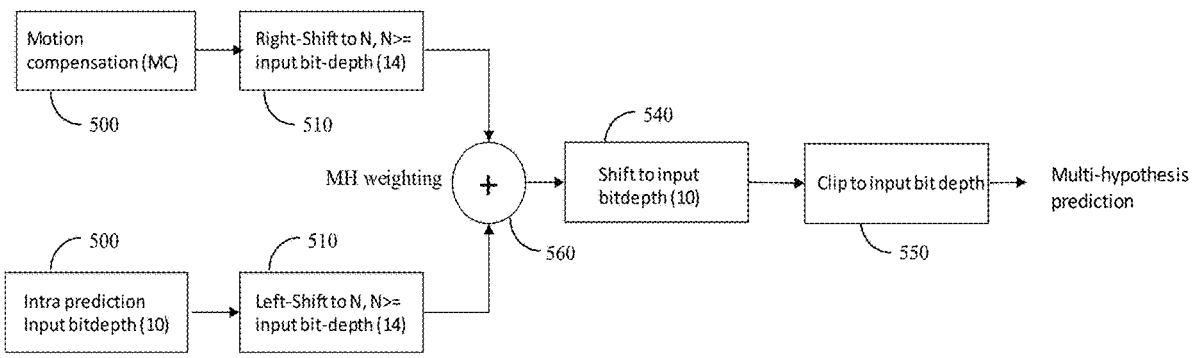
FIG. 10 depicts a flowchart of the multi-hypothesis prediction process according to one embodiment.

In one embodiment, inter bi-prediction is disabled in the case where MH is used as shown in FIG. 10. BIO is also disabled (by design) because it only applies to bi-prediction.

In one embodiment, triangle mode is disabled in the case where MH is used. Indeed, you already have a weighting process for the two triangle predictions as depicted on FIG. 5.

Furthermore, one can improve the MH combination stage when adding intra prediction to inter prediction with an increased bit-depth precision and before clipping operation. In FIG. 10, the MH process is carried out in N-bits.

Figure 11:
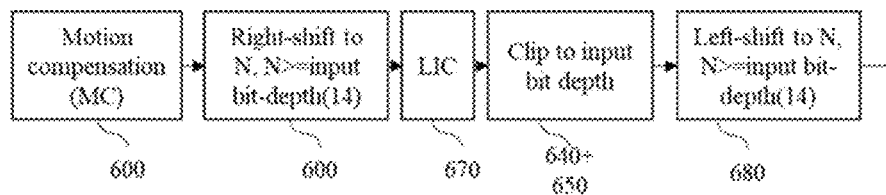
FIG. 11 depicts a flowchart of the motion compensation prediction process with local illumination compensation.
Figure 11:
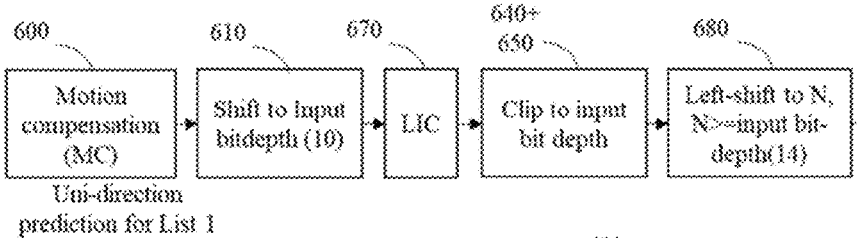
Figure 11:
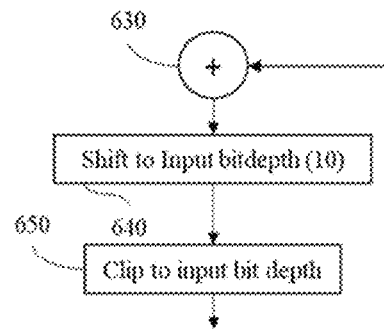

Reducing Pipeline Dependency for LIC:

FIG. 11 depicts the VVC software inter-prediction pipeline process for LIC in the case where the input bit-depth or internal bit-depth is equal to 10-bits and in the case where bi-prediction is used. First, motion compensation is applied to build two references block predictions (600). The result is stored in internal bit-depth precision (e.g. 10-bits) (610). Next, LIC parameters are estimated or retrieved from previously stored data and Illumination Compensation is applied (670). It comprises a weighting, plus adding an offset. Next right shifting to internal bit-depth (10-bits) (640) and clipping (650) are applied. The samples are then transformed into N-bits precision (680) before applying GBI weights (630).

$$P_{LIC} = (a \cdot P + b) >> \text{shift}_{LIC} \quad (\text{eq.6})$$

where: (a;b) are the LIC parameters,

P is the motion compensated block sample, $\text{shift}_{LIC}$ is the right shift so that $P_{LIC}$ is 10-bits, $P_{LIC}$ is the prediction samples with LIC.

Next, the sample values are stored (e.g. right shift) (640) and clipped (650) in internal bit-depth (e.g. 10-bits).

Basically, LIC introduces pipeline dependency with other neighboring reconstructed blocks and add a step after motion compensation to change illumination, as shown in FIG. 11. This dependency can be reduced by using one or more of the following constraints/restrictions.

In one embodiment, LIC is disabled for chroma component and/or small blocks (CU size below a value).

In one embodiment, GBI is disabled (or GBI weights are set to default weights) for chroma component and/or small blocks (CU size below a value).

Since the principle of LIC is to weight the prediction samples obtained by motion compensation, it has some similarities with GBI when the weights are not equal to default weights.

In one embodiment, LIC is disabled in bi-prediction in the case where GBI weights are not default weights. Therefore, IC-flag is not coded if the GBI-index is different from defaults. In merge mode, if GBI-index is inherited, then IC-flag is inferred to false if GBI weights are not defaults. In a variant, if IC-flag is inherited and its value is true, then GBI weights are inferred to be default weights. In a variant, if GBI weights are not default, one uses bi-dir-IC in place of traditional LIC.

In one embodiment, in the case where IC-flag is coded and IC-flag is true, then GBI-index is not coded and GBI weights are inferred to default weights. In a variant, in merge mode, in the case where IC-flag is inherited and its value is true, then GBI weights are inferred to default weights.

An example of syntax is provided in Table 2.

TABLE 2 example coding unit syntax where coding of GBI-index is conditioned to IC_flag value

| | Descriptor |
|---|---|
| coding_unit( x0, y0, cbWidth, cbHeight, treeType ) { | |
|   if( slice_type != I ) { | |
|     cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|     ... | |
|   } else { /* MODE_INTER */ | |
|     if( cu_skip_flag[ x0 ][ y0 ] ) { | |
|       ... | ae(v) |
|     } else { | |
|       merge_flag[ x0 ][ y0 ] | ae(v) |
|       if( merge_flag[ x0 ][ y0 ] ) { | |
|         ... | |
|       } else { | |
|         IC_flag | ae(v) |
|         if( slice_type = = B ) | |
|           inter_pred_idc[ x0 ][ y0 ] | ae(v) |
|         ... | |
|         if( inter_pred_idc[ x0 ][ y0 ] != PRED_L0 ) { | |
|           ... | ae(v) |
|           if( sps_gbi_enabled_flag && | |
|             inter_pred_idc[ x0 ][ y0 ] = = | |
|             PRED_BI && gbi_cond( ) ) { | |
|           if ( !IC_flag ) | |
|             gbi_idx[ x0 ][ y0 ] | ae(v) |
|           else | |
|             gbi_idx[ x0 ][ y0 ] = false | |
|         } | |
|       } | |
|     } | |
|   } | |
| } | |
| ... | |

In one embodiment, in the case where GBI weights are not default weights, IC-flag is coded even if the current CU is coded in "merge" mode.

In one embodiment, LIC is disabled in the case where the reconstructed samples "$\text{rec}_N$" belongs to one neighboring CU (called N) which has been coded with non-default GBI weights.

Virtual Pipeline Data Unit (VPDU) are defined as non-overlapping M×M-luma(L)/N×N-chroma(C) units in a picture. In hardware decoders, successive VPDUs are processed by multiple pipeline stages at the same time. Different stages process different VPDUs simultaneously. Typically, a VPDU is a 64×64-luma/32×32-chroma block. The three following conditions have to be verified:

For each VPDU containing one or multiple CUs, the CUs are completely contained in the VPDU.
For each CU containing one or more VPDUs, the VPDUs are completely contained in the CU.
The processing order of CUs shall not leave a VPDU and re-visit it later.

The block reconstruction dependency introduced with LIC may be acceptable for the data in cache memory, that corresponds typically to one CTU or to one VPDU that is related to the hardware and/or implementation memory cache constraint/limitation for decoding elementary CU and which is further related to the maximum sample region size the hardware can process all-in-one.

In one embodiment, LIC is disabled in the case where reconstructed samples "$rec_N$" of neighboring blocks N used to derive the LIC parameters are outside CTU or VPDU. In a variant, LIC may be used but using only reconstructed samples inside current CTU or VPDU.

In one embodiment, in the case where: the coding mode of the current block is "merge", the merge index indicates that the neighbor N is used for merging, this block has IC-flag equal to true (the IC parameters being denoted $IC_N$), and "$rec_N$" samples are outside CTU or VPDU, then IC-flag is true for current block and one re-uses $IC_N$ (LIC parameters used by the neighboring block N) for building prediction of the current block instead of using "$rec_N$" samples to derive current LIC parameters.

Figure 12:
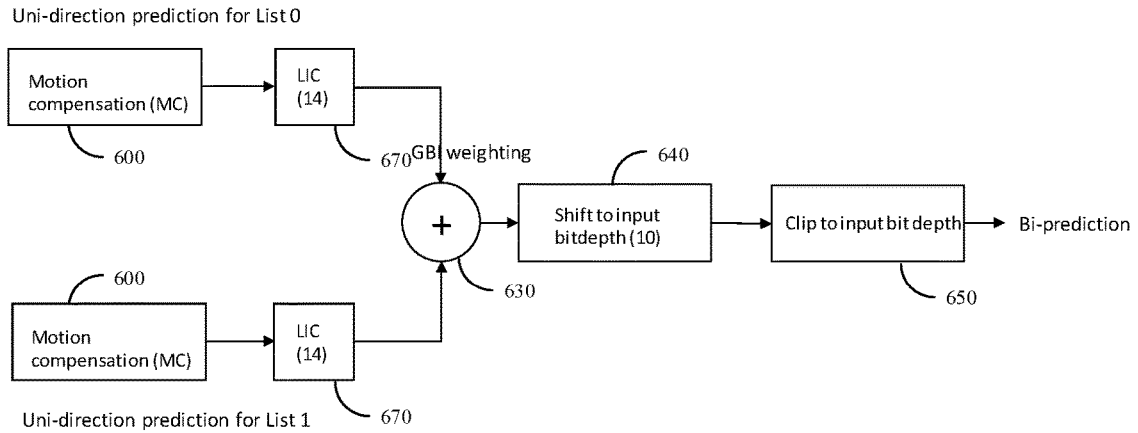
FIG. 12 depicts a flowchart of the motion compensation prediction process with local illumination compensation according to one embodiment.

In one embodiment, LIC is computed with increased precision (670), i.e. $shift_{LIC}$ (eq.6) is set so that sample precision is N-bits after LIC process and samples are clipped only at the end of the prediction process, as depicted in FIG. 12.

Reducing Pipeline Dependency for "Post-Reconstruction" Filters:

In one embodiment, the LIC process and "post-reconstruction" filtering process are mutually exclusive for each component (i.e. if LIC is enabled for one component then "post-reconstruction" filter is disabled for this component) or for all components (i.e. if LIC is enabled for all components then "post-reconstruction" filter is disabled for all components).

If "post-reconstruction" is not applied to one component (e.g. chroma), then if LIC is disabled for the current CU (e.g. LIC flag is false), then "post-reconstruction" may be applied for the other component only (e.g. luma).

Figure 1D:
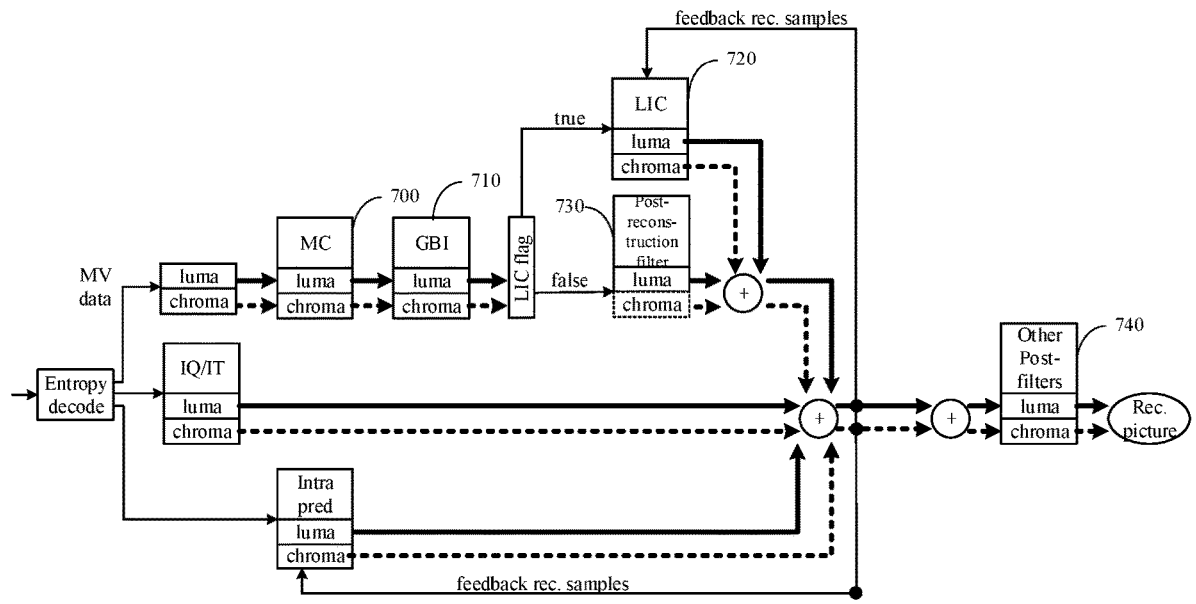
FIG. 1d depicts an overall decoding pipeline according to one embodiment.

For example, if LIC is enabled and/or is applied to the current CU (e.g. LIC flag is true, inferred or coded), the post-reconstruction filtering is disabled as depicted in FIG. 1*d* for all the components.

In another example, if the LIC process can be enabled per component (e.g. one LIC flag inferred or coded for Luma and another LIC flag inferred or coded for Chroma) the "post-reconstruction" filtering process is disabled for one component if LIC flag is enabled for this component.

Reducing Pipeline for OBMC:

OBMC may have less coding efficiency for small blocks while the average amount of processing per sample is increased significantly when the number of small blocks in picture is high. One may alleviate the pipeline by one or more of the following limitations.

In one embodiment, OBMC is disabled (i.e. not used) for small blocks (e.g. 4×4). In one embodiment, OBMC is not performed chroma blocks. In one embodiment, OBMC is disabled (i.e. not used) in the case where the current block uses LIC. In one embodiment, LIC is not used in the OBMC process. In one embodiment, BIO is not used in the OBMC process.

Reducing pipeline for BIO:

In one embodiment, BIO is disabled if GBI weights are not defaults.

BIO and DMVR are two techniques which have same purpose which is refining MVs. Therefore, BIO is disabled in the case where DMVR is used for the current block and vice versa (mutual exclusion).

Figure 13:
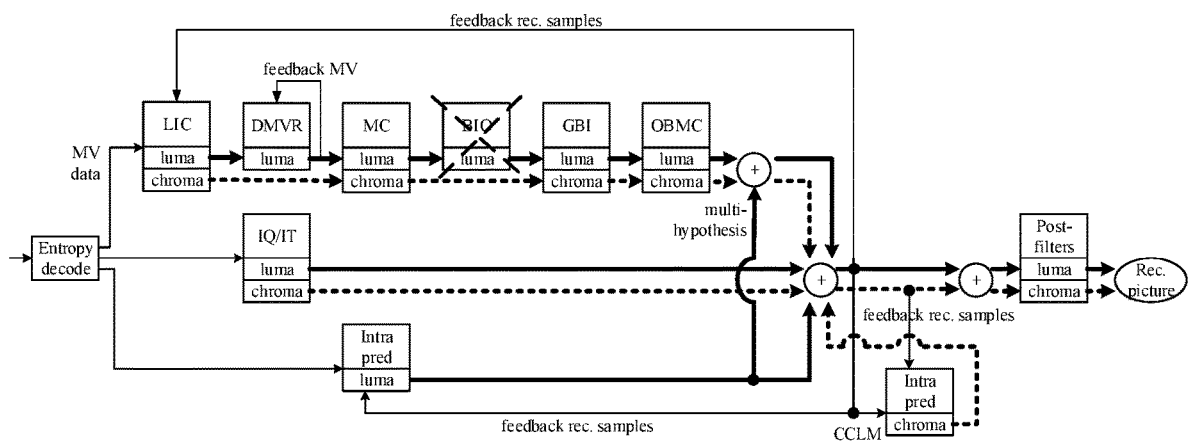
FIG. 13 depicts an overall decoding pipeline with local illumination compensation computed before Decoder Side Motion Vector Refinement according to one embodiment.

Reducing Pipeline for DMVR:

In the state-of-art, LIC is disabled with DMVR. Indeed, enabling LIC which includes calculation of the LIC parameters for each MV to be tested increases the amount of computation significantly. It has been proposed to perform DMVR without LIC and enable LIC process after DMVR stage as depicted in FIG. 1. However, since DMVR does not include LIC, the accuracy of MV refinement is significantly reduced. To cope with this limitation, one proposes to perform the LIC parameters calculation with the $MV_{initial}$ values (before MV refinement with DMVR) and not refining the LIC parameters in the DMVR process, i.e. the LIC parameters are not computed in or after the DMVR process, as depicted in FIG. 13.

Reducing Pipeline for Deblocking-Filter:

In one embodiment, DBF strength is reduced on one edge if OBMC is applied on this edge, and/or in the case where this edge belongs to one block which has LIC or BIO enabled.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 15:
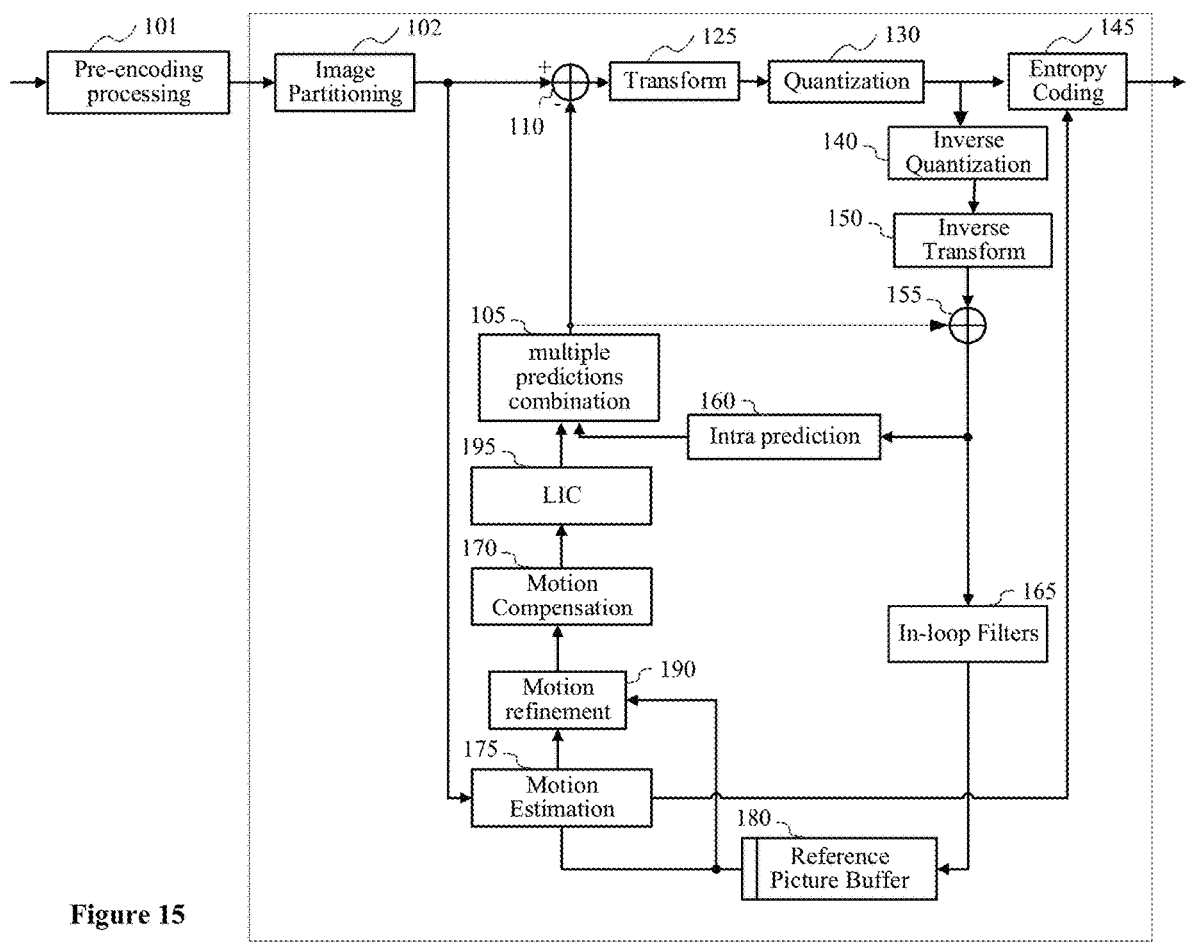
FIG. 15 illustrates a block diagram of a video encoder according to an embodiment.
Figure 16:
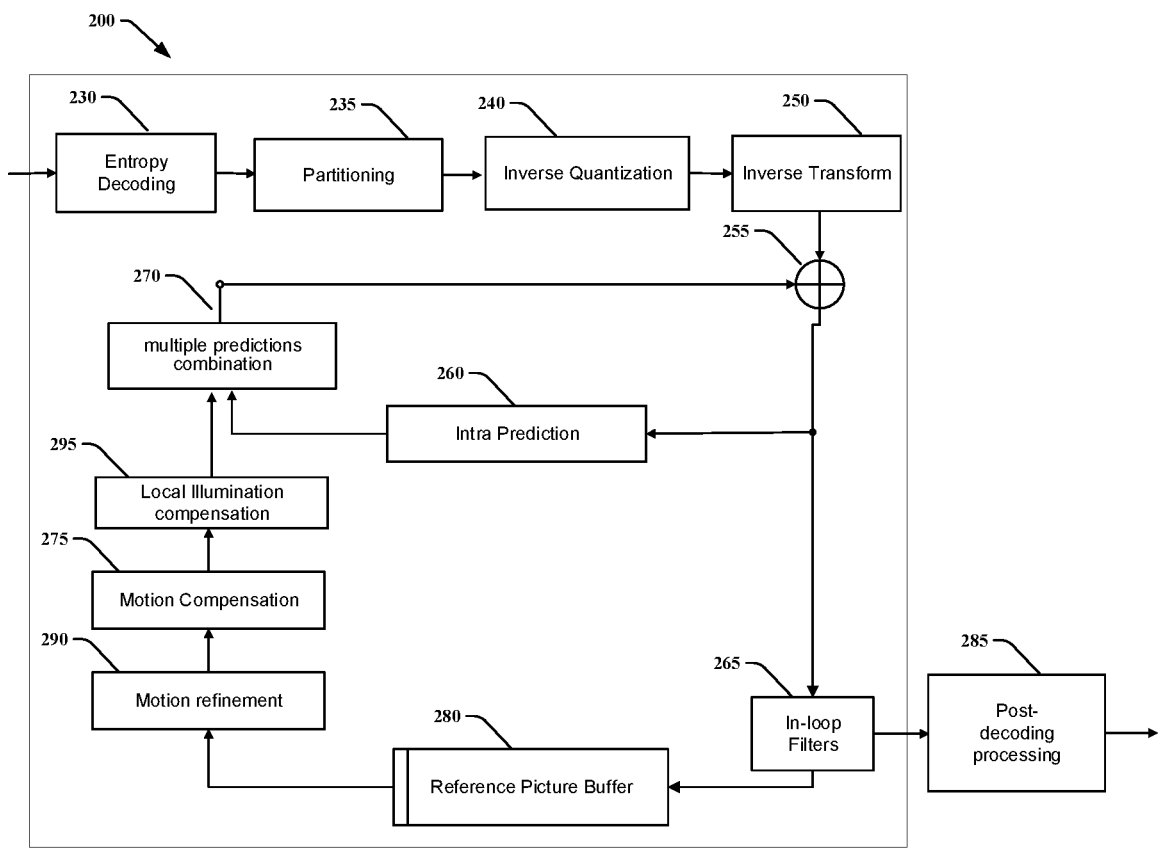
FIG. 16 illustrates a block diagram of a video decoder according to an embodiment.
Figure 17:
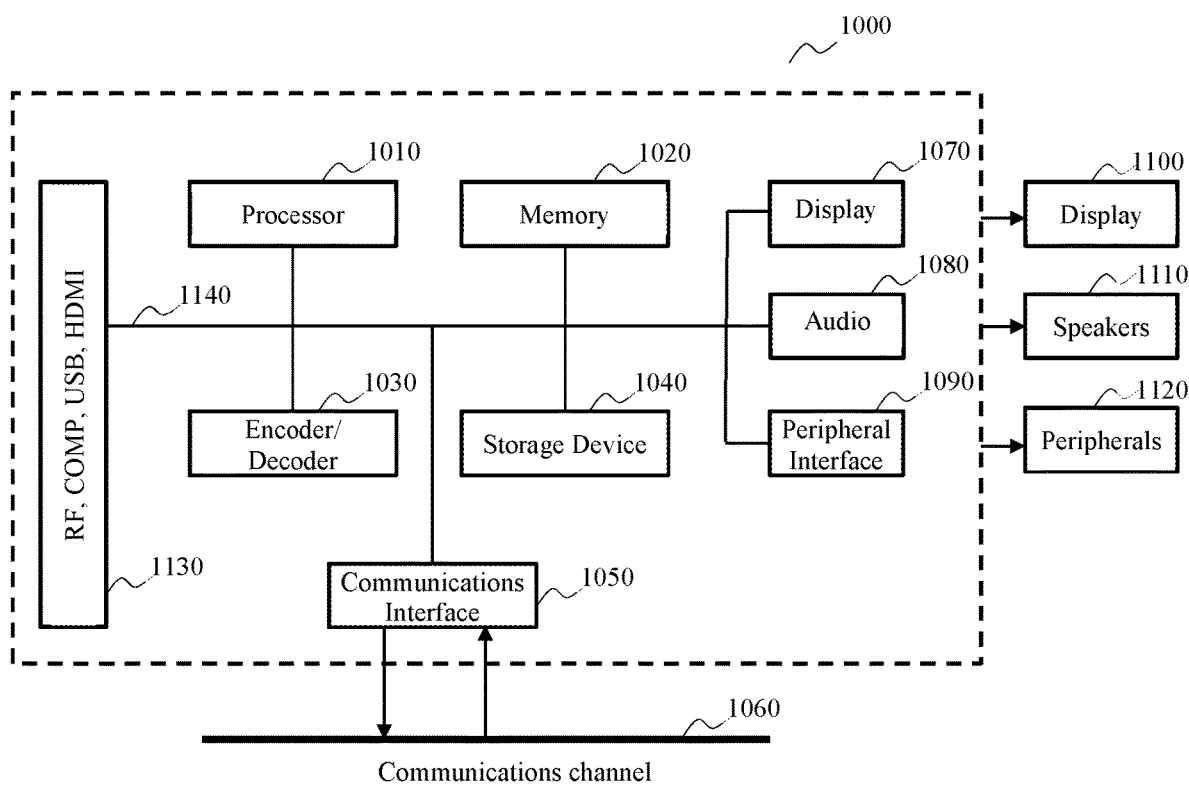
FIG. 17 illustrates a block diagram of an example of a system in which various aspects and embodiments are implemented.

The aspects described and contemplated in this application can be implemented in many different forms. FIGS. 15, 16 and 17 below provide some embodiments, but other embodiments are contemplated and the discussion of FIGS. 15, 16 and 17 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify various modules, for example, the motion compensation modules (170, 275), the motion refinement modules (190, 290), the LIC modules (195, 295), the multiple predictions combination modules (105, 270) of a video encoder 100 and decoder 200 as shown in FIGS. 15 and 16. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 15 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175), possibly motion refinement (190), motion compensation (170) and possibly illumination compensation (195) are performed. Motion refinement may use DMVR or BIO. The encoder decides (105) which one of the intra mode or inter mode to use for encoding the unit, and indicates the intra/inter decision by, for example, a prediction mode flag. The encoder may also combine (105) several predictions, e.g. in MH mode or in bi-directional prediction mode. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 16 illustrates a block diagram of a video decoder 200. In the decoder 200, a bitstream is decoded by the decoder elements as described below. Video decoder 200 generally performs a decoding pass reciprocal to the encoding pass as described in FIG. 15. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained from intra prediction (260), motion-compensated prediction (i.e., inter prediction) (275) or from a combination (270) of several predictions (e.g. in MH mode or in bi-directional mode). The motion compensated prediction may be further compensated in illumination (295). As the encoder, the decoder may also comprise a module configured to refine (e.g. using DMVR or BIO) the decoded motion vectors (290). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 17 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip. The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, motion and illumination compensation, motion refinement and multiple predictions combination.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, motion and illumination compensation, motion refinement and multiple predictions combination.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, IC-flag, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of coding mode. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination. Further, embodiments can include one or more of the following features, devices, or aspects, alone or in any combination, across various claim categories and types.

A TV, set-top box, cell phone, tablet, or other electronic device that performs adaptation of motion and illumination compensation, motion refinement and multiple predictions combination according to any of the embodiments described.

A TV, set-top box, cell phone, tablet, or other electronic device that performs adaptation of motion and illumination compensation, motion refinement and multiple predictions combination according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs adaptation of motion and illumination compensation, motion refinement and multiple predictions combination according to any of the embodiments described.

A TV, set-top box, cell phone, tablet, or other electronic device that receives (e.g. using an antenna) a signal over the air that includes an encoded image, and performs adaptation of motion and illumination compensation, motion refinement and multiple predictions combination according to any of the embodiments described.

According to a general aspect of at least one embodiment, a decoding method is disclosed that comprises:
  decoding parameters for a current block;
  disabling a coding tool for said current block in the case where one or more of the following conditions is verified: a first coding tool is used for said current block and a given condition on the decoded parameters is verified;
  enabling for said current block said coding tool otherwise; and
  decoding said current block responsive to said coding tool.

According to a general aspect of at least one embodiment, an encoding method is disclosed that comprises:
  obtaining parameters for a current block;
  disabling a coding tool for said current block in the case where one or more of the following conditions is verified: a first coding tool is used for said current block and a given condition on decoded parameters is verified;
  enabling for said current block said coding tool otherwise; and
  encoding said current block responsive to the coding tool.

According to a general aspect of at least one embodiment, a decoding apparatus is disclosed that comprises one or more processors configured to perform:
  decoding parameters for a current block;
  disabling a coding tool for said current block in the case where one or more of the following conditions is verified: a first coding tool is used for said current block and a given condition on the decoded parameters is verified;
  enabling for said current block said coding tool otherwise; and
  decoding said current block responsive to the coding tool.

According to a general aspect of at least one embodiment, an encoding apparatus is disclosed that comprises one or more processors configured to perform:
  obtaining parameters for a current block;
  disabling a coding tool for said current block in the case where one or more of the following conditions is verified: a first coding tool is used for said current block and a given condition on decoded parameters is verified;
  enabling for said current block said coding tool otherwise; and
  encoding said current block responsive to the coding tool.

In one embodiment, disabling a coding tool for said current block in the case where one or more of the following conditions is verified comprises disabling inter bi-prediction in the case where multi-hypothesis coding mode is used for the current block.

In one embodiment, disabling a coding tool for said current block in the case where one or more of the following conditions is verified comprises disabling local illumination compensation in the case where multi-hypothesis coding mode is used for the current block.

In one embodiment, disabling a coding tool for said current block in the case where one or more of the following conditions is verified comprises disabling triangle partitioning in the case where multi-hypothesis coding mode is used for the current block.

In one embodiment, disabling a coding tool for said current block in the case where one or more of the following conditions is verified comprises disabling local illumination compensation or OBMC for one or more of small block and chroma component.

In one embodiment, disabling a coding tool for said current block in the case where one or more of the following conditions is verified comprises disabling local illumination compensation in the case where generalized bi-prediction weights are not equal to default weights.

In one embodiment, disabling a coding tool for the current block in the case where one or more of the following conditions is verified comprises disabling generalized bi-prediction (or setting generalized bi-prediction weights to default weights) and not coding a generalized bi-prediction index in the case where local illumination compensation is enabled for said current block.

In one embodiment, disabling a coding tool for said current block in the case where one or more of the following conditions is verified comprises disabling local illumination compensation in the case where neighboring samples of said current block used by local illumination compensation belong to a block using generalized bi-prediction weights not equal to default weights.

In one embodiment, disabling a coding tool for said current block in the case where one or more of the following conditions is verified comprises disabling Overlapped Block Motion Compensation in the case where local illumination compensation is used.

In one embodiment, disabling a coding tool for said current block in the case where one or more of the following conditions is verified comprises disabling local illumination compensation and/or generalized bi-prediction in the case where weights are not equal to default weights in the Overlapped Block Motion Compensation process in the case where Overlapped Block Motion Compensation is used.

The invention claimed is:

1. A decoding method comprising:
  decoding a first block level parameter for a current block;
  disabling a Bi-directional Optical flow mode for the current block responsive to a first condition being verified, the Bi-directional Optical flow mode allowing refining a motion of samples of a block based on an optical flow, wherein the first condition is verified responsive to the decoded first block level parameter indicating a multi-hypothesis coding mode combining inter and intra prediction is used for the current block, the multi-hypothesis coding mode comprising obtaining a predictor for the current block, the predictor being a weighted average between an inter predictor of the current block and an intra predictor of the current block; and decoding the current block.

2. The method of claim 1, wherein the first condition is further verified responsive to a decoded second block level parameter indicating generalized bi-prediction weights are not equal to default weights.

3. The method of claim 1, further comprising disabling a triangle mode for the current block responsive to the first condition being verified, the triangle mode comprising partitioning a predictor block in two partitions separated by a diagonal edge, each partition being associated to a different inter predictor block.

4. An encoding method comprising:
obtaining a first block level parameter for a current block;
disabling a Bi-directional Optical flow mode for the current block responsive to a first condition being verified, the Bi-directional Optical flow mode allowing refining a motion of samples of a block based on an optical flow, wherein the first condition is verified responsive to the obtained first block level parameter indicating a multi-hypothesis coding mode combining inter and intra prediction is used for the current block, the multi-hypothesis coding mode comprising obtaining a predictor for the current block, the predictor being a weighted average between an inter predictor of the current block and an intra predictor of the current block; and
encoding the current block.

5. The method of claim 4, wherein the first condition is further verified responsive to an obtained second block level parameter indicating generalized bi-prediction weights are not equal to default weights.

6. A decoding apparatus comprising one or more processors configured to perform:
decoding a first block level parameter for a current block;
disabling a Bi-directional Optical flow mode for the current block responsive to a first condition being verified, the Bi-directional Optical flow mode allowing refining a motion of samples of a block based on an optical flow, wherein the first condition is verified responsive to the decoded first block level parameter indicating a multi-hypothesis coding mode combining inter and intra prediction is used for the current block, the multi-hypothesis coding mode comprising obtaining a predictor for the current block, the predictor being a weighted average between an inter predictor of the current block and an intra predictor of the current block; and
decoding the current block.

7. The decoding apparatus of claim 6, wherein the first condition is further verified responsive to a decoded second block level parameter indicating generalized bi-prediction weights are not equal to default weights.

8. An encoding apparatus comprising one or more processors configured to perform:
obtaining a first block level parameter for a current block;
disabling a Bi-directional Optical flow mode for the current block responsive to a first condition being verified, the Bi-directional Optical flow mode allowing refining a motion of samples of a block based on an optical flow, wherein the first condition is verified responsive to the obtained first block level parameter indicating a multi-hypothesis coding mode combining inter and intra prediction is used for the current block, the multi-hypothesis coding mode comprising obtaining a predictor for the current block, the predictor being a weighted average between an inter predictor of the current block and an intra predictor of the current block; and
encoding the current block.

9. A non-transitory information storage medium storing program code instructions for implementing the method according to claim 1.

10. A non-transitory information storage medium storing program code instructions for implementing the method according to claim 4.

11. The method of claim 4, further comprising disabling a triangle mode for the current block responsive to the first condition being verified, the triangle mode comprising partitioning a predictor block in two partitions separated by a diagonal edge, each partition being associated to a different inter predictor block.

12. The method of claim 4, further comprising disabling generalized bi-prediction or setting generalized bi-prediction weights to default weights responsive to a second condition being verified, wherein the second condition is verified responsive to a size of the block is below a value.

13. The decoding apparatus of claim 6, wherein the one or more processors are further configured to perform: disabling a triangle mode for the current block responsive to the first condition being verified, the triangle mode comprising partitioning a predictor block in two partitions separated by a diagonal edge, each partition being associated to a different inter predictor block.

14. The decoding apparatus of claim 6, wherein the one or more processors are further configured to perform: disabling generalized bi-prediction or setting generalized bi-prediction weights to default weights responsive to a second condition being verified, wherein the second condition is verified responsive to a size of the block is below a value.

15. The encoding apparatus of claim 8, wherein the first condition is further verified responsive to an obtained second block level parameter indicating generalized bi-prediction weights are not equal to default weights.

16. The encoding apparatus of claim 8, wherein the one or more processors are further configured to perform: disabling a triangle mode for the current block responsive to the first condition being verified, the triangle mode comprising partitioning a predictor block in two partitions separated by a diagonal edge, each partition being associated to a different inter predictor block.

17. The encoding apparatus of claim 8, wherein the one or more processors are further configured to perform: disabling generalized bi-prediction or setting generalized bi-prediction weights to default weights responsive to a second condition being verified, wherein the second condition is verified responsive to a size of the block is below a value.

18. The method of claim 1, further comprising disabling generalized bi-prediction or setting generalized bi-prediction weights to default weights responsive to a second condition being verified, wherein the second condition is verified responsive to a size of the block is below a value.

* * * * *